United States Patent [19]
Blaeser et al.

[11] Patent Number: 5,912,788
[45] Date of Patent: *Jun. 15, 1999

[54] FLEXURE REGION FOR ONE-PIECE FLEXURE-LOAD BEAM STRUCTURE

[75] Inventors: David J. Blaeser, Champlin; Ryan A. Jurgenson, Hutchinson, both of Minn.

[73] Assignee: Hutchinson Technology Inc., Hutchinson, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,349

[22] Filed: Jan. 3, 1997

Related U.S. Application Data

[63] Continuation of application No. 08/415,715, Apr. 3, 1995, abandoned, which is a continuation-in-part of application No. 08/039,892, Mar. 30, 1993, abandoned, which is a continuation-in-part of application No. 08/612,012, Nov. 9, 1990, Pat. No. 5,198,945.

[51] Int. Cl.⁶ .................................................. G11B 5/58
[52] U.S. Cl. ............................................................. 360/104
[58] Field of Search ..................................... 360/103, 104, 360/105, 106, 107

[56] References Cited

U.S. PATENT DOCUMENTS

| | | | |
|---|---|---|---|
| 4,197,566 | 4/1980 | Suzuki et al. | 360/103 |
| 4,268,879 | 5/1981 | Watrous | 360/104 |
| 4,280,156 | 7/1981 | Villette | 360/105 |
| 4,286,297 | 8/1981 | Root et al. | 360/103 |
| 4,302,789 | 11/1981 | Vos | 360/105 |
| 4,389,688 | 6/1983 | Higashiyama | 360/104 |
| 4,449,155 | 5/1984 | Meier et al. | 360/104 |
| 4,473,855 | 9/1984 | Plotto et al. | 360/104 |
| 4,630,158 | 12/1986 | Spash | 360/103 |
| 4,700,250 | 10/1987 | Kuriyama | 360/104 |
| 4,724,500 | 2/1988 | Dalziel | 360/103 |
| 4,757,402 | 7/1988 | Mo | 360/103 |
| 4,792,875 | 12/1988 | Ohdaira | 360/104 |
| 4,843,502 | 6/1989 | Tagawa | 360/105 |
| 4,853,812 | 8/1989 | Daito et al. | 360/104 |
| 4,853,813 | 8/1989 | Yamanouchi | 360/104 |
| 4,876,623 | 10/1989 | Takekado | 360/104 |
| 4,894,740 | 1/1990 | Chhabra et al. | 360/103 |
| 4,896,233 | 1/1990 | Yamada | 360/104 |

(List continued on next page.)

FOREIGN PATENT DOCUMENTS

| | | | |
|---|---|---|---|
| 58-6552 | 1/1983 | Japan . | |
| 60-167172 | 8/1985 | Japan . | |
| 60-246015 | 4/1986 | Japan . | |
| 61-96509 | 5/1986 | Japan | 360/103 |
| 3-176878 | 7/1991 | Japan | 360/103 |

*Primary Examiner*—David L. Ometz
*Attorney, Agent, or Firm*—Faegre & Benson LLP

[57] ABSTRACT

A magnetic head suspension for supporting a magnetic head at a fixed distance from a rigid actuator arm has a single one-piece structure with a flexure region and a load beam region. A proximal end of the load beam region is joined to the rigid actuator arm. The flexure region projects distally beyond the load beam region. The flexure region is divided into a head support region, at least a first set of arms, such that at least one set of arms is formed with offsets which position the plane of the head support region recessed from the plane of the load beam region. The head support region is constructed and arranged for receiving a head slider to be bonded thereto. The first set of arms is defined by a first set of slots in a surface of the flexure region, the first set of slots also defining a perimeter of the head support region, each of the first set of arms generally enclosing at least a part of a perimeter of the head support region. There may also be a second set of relatively inflexible arms, defined by a second set of slots in a surface of the flexure region, such that the second set of slots also defines a perimeter of the first set of arms. At least one of the sets of arms is constructed and arranged with formed offsets, which position a plane of the head support region recessed from a plane of the load beam region.

6 Claims, 7 Drawing Sheets

U.S. PATENT DOCUMENTS

| | | | |
|---|---|---|---|
| 4,922,356 | 5/1990 | Yamaguchi et al. | 360/104 |
| 4,943,875 | 7/1990 | Reidenbach et al. | 360/104 |
| 4,947,275 | 8/1990 | Hinlein | 360/104 |
| 4,954,919 | 9/1990 | Yamada | 360/104 |
| 4,992,898 | 2/1991 | Wanlass | 360/104 |
| 5,012,369 | 4/1991 | Owe et al. | 360/104 |
| 5,014,144 | 5/1991 | Sato et al. | 360/104 |
| 5,079,660 | 1/1992 | Yumura et al. | 360/104 |
| 5,198,945 | 3/1993 | Blaeser et al. | 360/104 |
| 5,282,102 | 1/1994 | Christianson | 360/104 |
| 5,383,073 | 1/1995 | Masukawa et al. | 360/104 |

FLEXURE REGION FOR ONE-PIECE FLEXURE-LOAD BEAM STRUCTURE

This application is a continuation application from commonly assigned U.S. application Ser. No. 08/415,715, filed Apr. 3, 1995, now abandoned, which was a continuation-in-part of commonly assigned U.S. application Ser. No. 08/039,829, filed Mar. 30, 1993, now abandoned, which was a continuation-in-part of U.S. application Ser. No. 07/612,012, filed Nov. 9, 1990, now U.S. Pat. No. 5,198,945, issued Mar. 30, 1993.

BACKGROUND OF THE INVENTION

The present invention is an improved magnetic head suspension assembly (HSA) for use with dynamic magnetic storage devices or rigid disk drives. More exactly, it is a head suspension assembly that has a one-piece structure constructed with a load beam and a flexure region. Specifically, this invention describes improvements in the construction of the flexure region to improve dynamic performance of the HSA, decrease pitch and roll stiffnesses, increase lateral and in plane stiffnesses, improve manufacturability, and improve head bond location.

Conventionally available magnetic head suspension assemblies for rigid disk drives allow magnetic read/write heads to pitch about a first or transverse axis and roll about a second or longitudinal axis, orthogonal to the first axis, when imperfections in the disk drive assembly tend to place the heads in improper positions relative to the associated disk surface. The present invention allows significant reductions in the pitch and roll stiffness of the head suspension assembly, thus allowing the heads to easily maintain proper attitude to the disk. At the same time, the present invention increases stiffness in the direction of rotation of the disk to maintain proper head position with respect to the suspension assembly. Further, the invention resists permanent distortion to the HSA which can be caused by forces in all directions.

Conventional head suspension assemblies consist of a support baseplate, load beam, and flexure, which are usually separately etched, stamped and then welded together. According to the present invention, the flexure is constructed as an integral part of the load beam, which reduces manufacturing steps and improves the ability to manufacture the HSA with the proper head position and attitude.

Conventional head suspension attachments or base plates are welded to the load beam and attached to an actuator arm and are generally configured for swage or screw attachment means. As described in commonly assigned U.S. Pat. No. 5,198,945, issued Mar. 30, 1993, the attachment means is an integral part of the load beam. This method of attachment avoids welding, thus reducing process steps, easing disk drive assembly, and improving the ability to position the head properly with respect to the actuator arm. The load beam attaches to the actuator arm by an attachment means employing an interference fit, such as a clip.

As also described in U.S. Pat. No. 5,198,945, the load beam can be attached to the actuator arm by a shrink fit interference means encircling the arm and load beam(s). Such a shrink fit can be performed by heating the shrink fit interference means to expand and then contract around the actuator arm and load beam(s), or by heating the shrink fit interference means to simply contract around the actuator arm and load beam(s). This method of attachment reduces the number of components and process steps, and allows the HSA to be attached to and removed from the actuator arm easily.

Conventional means for positioning and aligning the read/write head to the suspension assembly, when attaching the head suspension assembly to the actuator arm, is to place an alignment pin through a hole in the load beam, another alignment pin through a hole(s) in the baseplate, and mount the baseplate and the actuator arm with screws or with the baseplate boss. As also described in U.S. Pat. No. 5,198,945, an alignment pin is positioned through a hole in the load beam and another alignment pin is positioned through a slot at the base end to improve the accuracy and ease of positioning the head with respect to the suspension assembly and to facilitate the alignment of the head suspension assembly with respect to the actuator arm. As can be readily understood, this arrangement may equally well be reversed, with a hole positioned in the base end and a slot positioned in the load beam. The pin/hole registration will keep the parts aligned in the x and y directions, while the pin/slot registration keeps the parts from rotating about the z axis. Further, a single one-piece suspension structure constructed with both a load beam region and a flexure region eliminates the tolerance build up from welding three separate components together and allows the head location to depend solely on the precision manufacture of the holes and slots.

Conventionally available magnetic head suspension assemblies have load beams with rails extending either away from the rigid disk or toward the rigid disk, as shown in commonly assigned co-pending application Ser. No. 08/050,517, filed Apr. 20, 1993, which in turn is a continuation of Ser. No. 07/583,048, filed Sep.14, 1990, now abandoned.

In the prior art, the rail oriented to project from the surface of the load beam, away from the associated disk surface, offered increased clearance between the disk and the load beam for lifting the load beam, while the rail oriented toward the disk surface offered increased clearance between two back to back head suspension assemblies and allowed for closer disk spacing. The present construction offers increased clearance on both sides of the head suspension assembly for lifting the load beam and for allowing closer disk spacing. U.S. Pat. No. 5,198,945 uses a rail form line that is not parallel to the disk surface over its entire length but is closer to the disk at the slider end and withdrawn from the disk at the base end, such that the lift clearance can be maximized near the base plate and the disk spacing clearance can be maximized near the slider.

BRIEF DESCRIPTION OF THE INVENTION

According to the present invention, a magnetic head suspension, for supporting a magnetic head at a fixed distance from a rigid actuator arm, has a single one-piece structure having a flexure region and a load beam region. In the single one-piece structure, a proximal end of the load beam region is joined to the rigid actuator arm, and the flexure region projects distally beyond the load beam region. The flexure region is divided into a planar head support region, and a set of at least two flexible arms, defined by a first set of slots in a surface of the flexure region. The head support region is constructed and arranged for receiving a head slider to be bonded thereto. The slots which define the set of at least two flexible arms also define a perimeter of the head support region. Each of the arms generally enclose at least a part of a perimeter of the head support region. The arms are constructed and arranged for flexible suspension of the head support region by formed offsets, which position a plane of the head support region recessed from a plane of the load beam region. The slot patterns together with the offsets can be referred to as an arrangement of offset forms.

Also according to this invention, a magnetic head suspension, for supporting a magnetic head at a fixed distance from a rigid actuator arm, has a single one-piece structure having a flexure region and a load beam region. A proximal end of the load beam region is joined to the rigid actuator arm. The flexure region projects distally beyond the load beam region. The flexure region is divided into a head support region, a first set of flexible arms, defined by a first set of slots in a surface of the flexure region, and a second set of flexible arms, defined by a second set of slots in a surface of the flexure region. The flexure region is constructed and arranged for receiving a head slider to be bonded thereto. The first set of slots, which defines the first set of flexible arms, also defines a perimeter of the head support region. Each of the first set of arms generally encloses at least a part of the perimeter of the head support region. The slots of at least one of the flexible arms are generally arcuate. The second set of flexible arms is defined by a second set of slots in the surface of the flexure region. The second set of slots also defines a perimeter of the first set of arms. The second set of arms is constructed and arranged with formed offsets, which position a plane of the head support region recessed from a plane of the load beam region.

Further, according to the present invention, a magnetic head suspension for supporting a magnetic head at a fixed distance from a rigid actuator arm, has a single one-piece element having a flexure region and a load beam region. In the one-piece element, a proximal end of the load beam region is joined to the rigid actuator arm, and the flexure region projects beyond the load beam region. The flexure region is divided into a head support region for receiving a disk drive head to be bonded thereto. A first set of slots in the flexure region is around substantially the entire perimeter of the head support region, with exception of a first set of two support pivot points aligned on opposite sides of the head support region, to define a first set of flexible arms for supporting the head support region for gimballed movement about a first rotational axis. A second pair of slots in the flexure portion is around substantially the entire perimeter of the first set of arms, with exception of a second set of two support pivot points aligned on opposite sides of the head support region, to define a second set of flexible arms for supporting the head support region for gimballed movement about a second rotational axis of the head support region, which is angularly spaced from the first rotational axis. The second set of flexible arms are constructed and arranged with formed offsets, which position a plane of the head support region and the first set of arms recessed from a plane of the second set of arms and the load beam region.

Also, according to this invention, a magnetic head suspension for supporting a magnetic head at a fixed distance from a rigid actuator arm, has a single one-piece structure having a flexure region and a load beam region. The structure comprises a proximal end of the load beam region joined to the rigid actuator arm and the flexure region projecting distally beyond the load beam region. The flexure region is divided into a head support region for receiving a disk drive head slider to be bonded thereto, a first set of slots in the flexure region to define a first set of flexible arms, and a second set of slots in the flexure region around substantially the entire perimeter of the first set of arms, to define a second set of flexible arms. Each arm of the first set of flexible arms terminates at either arm end in equally spaced first intersection points about a perimeter of the head support region, for suspending the head support region for gimballed movement relative to the load beam region. The flexible arms are generally curved. The second set of slots in the flexure region is around substantially the entire perimeter of the first set of arms, to define a second set of flexible arms, each of which terminates at either end to equally spaced second intersection points about a perimeter of the first set of arms, for suspending the first set of arms for gimballed movement relative to the load beam region. The first intersection points lie on a first axis of the suspension, and the second intersection points lie on a second axis of the suspension, radially spaced from the first axis of the suspension. The second set of flexible arms are constructed and arranged with formed offsets, which recess a plane of the head support region and the first set of arms from a plane of the second set of arms and the load beam region.

By constructing the load beam and flexure as a single one-piece structure, the accuracy of orientation of the flexure in relation to the load beam is carefully controlled and the overall construction is optimized to improve its dynamic characteristics and greatly reduce its size.

It is an object of the present invention to provide an improved magnetic head suspension having a single one-piece structure with a load beam region and a flexure region.

It is also an object of the present invention to provide a flexure having reduced flexure pitch and roll stiffness and increased lateral or rotary stiffness. High lateral stiffness serves two purposes. One purpose is to provide a spring to counteract lateral accelerations at the head. The lateral accelerations may result from, but are not limited to, such events as the head coming to a crash stop during a seek, or a drive subjected to external accelerations, such as those found in portable applications. Assuming the lateral forces generated are below the design limits, a one-piece structure having both a flexure region and a load beam region, as described for the present invention, will return the head to its original position.

Traditional dimple/load beam interfaces, that is, a Watrous style flexure constructed separately from and attached to a load beam, will not return the head to its original position. The difference is that with the one-piece structure having both a flexure region and a load beam region, according to the present invention, the head is positioned relative to the load beam with a set of linear "springs". Dimple/load beam interfaces of the prior art use linear springs in combination with non-linear frictional effects to provide positioning of the head. The result is that, when the head is subjected to high lateral accelerations, the relatively low lateral stiffness of the flexure of the prior art will not return the head completely. The head will be offset from the desired location by the distance where the lateral stiffness equals the dynamic friction at the dimple/load beam interface.

A further object of the present invention is to provide a load beam with increased clearance between itself and the rigid disk, increased clearance on the opposing side of the load beam to reduce disk spacing or total rigid disk drive spacing, improved resonance, and lowered spring rate.

These and other objects of the present invention will be apparent with reference to the drawings, the description of the preferred embodiment, and the claims.

DETAILED DESCRIPTION OF THE INVENTION

The improved one-piece flexure and load beam structure 10 for use in an improved magnetic head suspension, illustrated in FIGS. 1–6, consists of head support region 12 which projects beyond distal end 13 of load beam region 14. Head support region 12 is where slider 11a, shown in FIG. 3, the element which supports the read-write head, is bonded.

The load beam and flexure structure 10 has provisions at its proximal end 15 for attachment to a disk drive rigid actuator arm, which is not illustrated. In the embodiment shown in FIG. 1, a swaging boss 16 is provided for constructing a swaged connection to an actuator arm or E-Block, utilizing well known swaging techniques. Alternatively, load beam and flexure structure 10 may be secured to the actuator arm using bolts, or an attachment means as disclosed in commonly assigned U.S. Pat. No. 5,198,945, in FIGS. 7 and 8 thereof, or any other commonly used attachment means.

In the embodiment shown in FIGS. 1–6, the head support region 12 is constructed integrally with the flexure and load beam structure 10, rather than being formed as a separate element which is then welded to the load beam. Such separate elements are known, for example, in the prior art Watrous patent and in a number of subsequent patents. In the embodiment according to FIGS. 1–6, the integral flexure region is constructed by etching a number of slots 18, 20, 21, 22, 24 in the vicinity of the distal end 13 of the load beam region 14, in order to form a pair of flexible arms 26, 28 which provide low stiffness in the pitch and roll axes, and to form a pair of relatively inflexible arms 29, 31 (relative to the flexible arms 26, 28), which serve as an outer frame. Thus, head support region 12 is able to move freely about those axes, while providing high translational stiffness to keep the head, mounted on head support region 12, from moving side to side or front to back as the actuator moves the slider across the face of the disk.

Figure 3:
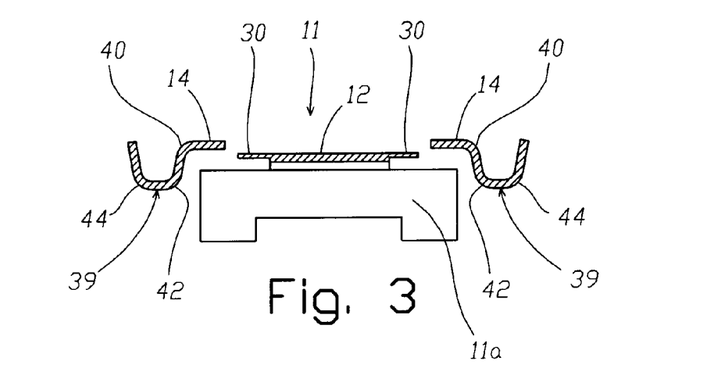
FIG. 3 is a sectional view, similar to that of FIG. 2, and showing a read/write head slider bonded to the head support region.
Figure 4:
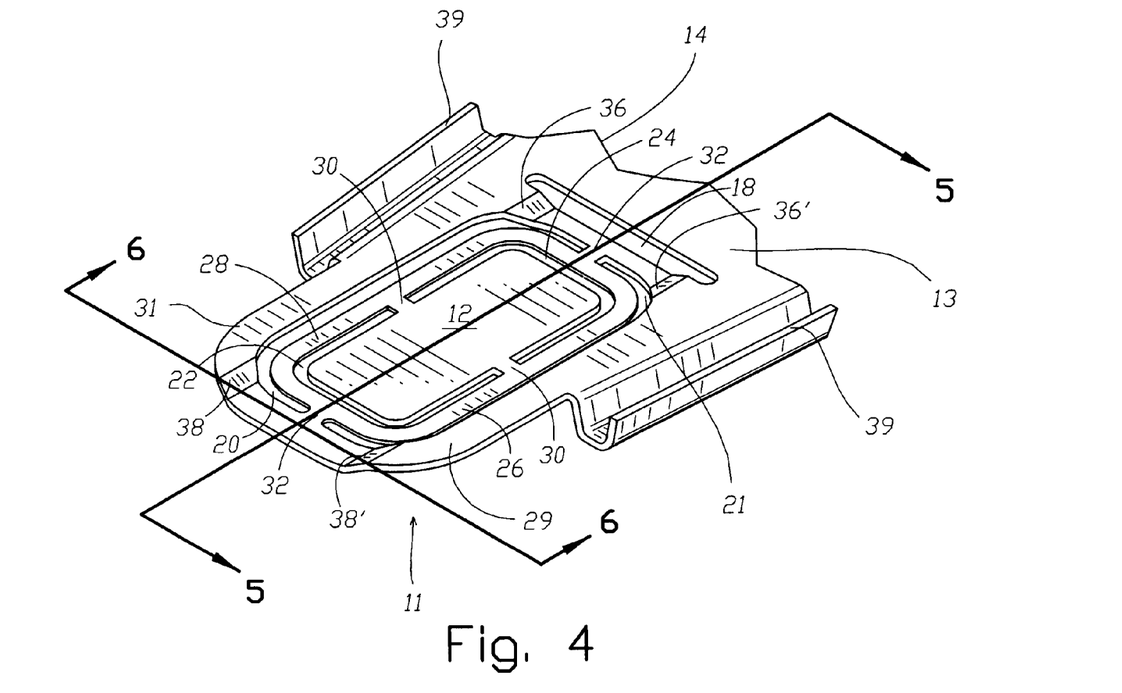
FIG. 4 is a top perspective detail view of the flexure region of the suspension in FIG. 1.

Referring to the detail shown in FIGS. 3 and 4, it can be seen that the first set of slots 22 and 24, which enclose at least a portion of the perimeter of head support region 12, leave only connecting torsion bars 30 between the edges of head support region 12 and the remainder of the flexure and load beam structure 10. Thus, the head support region 12 is relatively freely pivotable about a first or transverse axis, drawn through the first set of connecting torsion bars 30, which connect head support region 12 to the first set of flexible arms 26 and 28, and which are themselves interconnected to the body of the flexure and load beam structure 10 by the second set of connecting torsion bars 32. Connecting torsion bars 32 suspend head support region 12 and the first set of flexible arms 26 and 28 about the second or longitudinal axis, which is orthogonal to the first or transverse axis. Torsion bars 30, 32 combined with flexible arms 26, 28 make up the spring elements which allow gimballing suspension of head support region 12.

Figure 2:
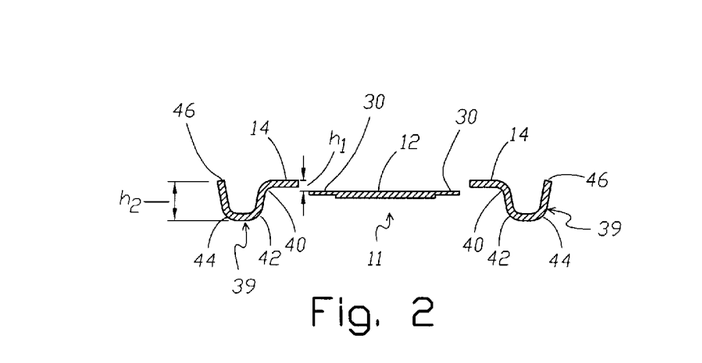
FIG. 2 is a sectional view of the structure in FIG. 1 taken along the line 2—2.

As can be seen in the sectional views of FIGS. 2 and 3, connecting torsion bars 30 are partially thinned. The first set of flexible arms 26 and 28 and the second set of connecting torsion bars 32 may also be partially thinned. The first or transverse axis is also generally referred to as a pitch axis, while the second or longitudinal axis is also generally referred to as a roll axis.

Figure 5:
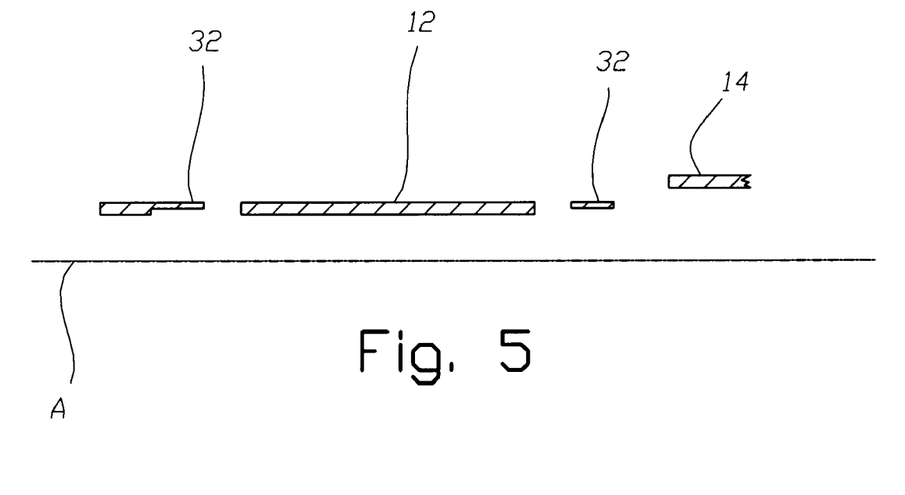
FIG. 5 is a sectional view of the flexure region of FIG. 4, taken along the line 5—5.
Figure 6:
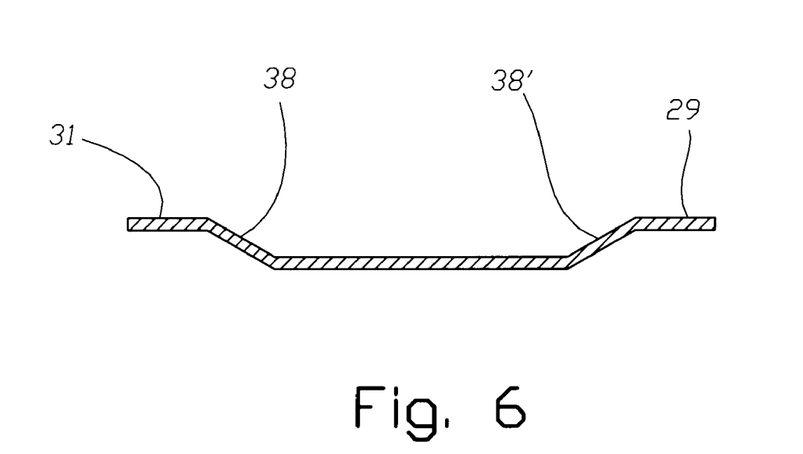
FIG. 6 is a sectional view of the flexure region of FIG. 4, taken along the line 6—6.

As shown in the detail in FIG. 4, and in the sectional views of FIGS. 5 and 6, offsets 36, 36' and 38, 38' are formed in the surface of the flexure region 11 to provide clearance for a head mounted on the head support region 12, by vertically adjusting its position relative to the surface of flexure and load beam structure 10. Offsets 36, 36' and 38, 38' can be formed by either etching, punch and cavity forming, stamping or similar processes.

The cross-sectional views of the head support region 12, shown in FIGS. 2, 3, 5 and 6, illustrate that head support region 12 is recessed below the surface of the flexure and load beam structure 10 by a height h1. FIGS. 2, 3 and 5 also illustrate that the first set of flexible arms 26, 28 and the connecting torsion bars 30, 32 are etched to reduce stiffness and provide clearance between other arms and the head to avoid interference with gimballing motion.

By providing a single one-piece structure 10 having a flexure region 11 and a load beam region 14, the error build-up which arises from the prior art process of mounting a separate flexure region on the load beam element is eliminated. The partial etching to thin areas of the flexure region 11, such as the flexible arms 26, 28, allows for the achievement of lower pitch and roll stiffnesses, while maintaining standard strength characteristics in the remainder of the integral load beam 14.

Also illustrated in FIGS. 1–4, 7, 9, 11 and 13 is a stiffening rail formation 39 which differs substantially from load beam reinforcement arrangements normally found in prior art slider suspensions. At the distal end of the suspension, it can be seen that the edge of the load beam is bent downwardly about a first radius 40 and then bent about radii 42 and 44 to shape a channel or stiffening rail 39, which has its edge 46 terminate generally in the plane of the surface of load beam element 14, as can be seen in FIGS. 2 and 3.

Figure 1:
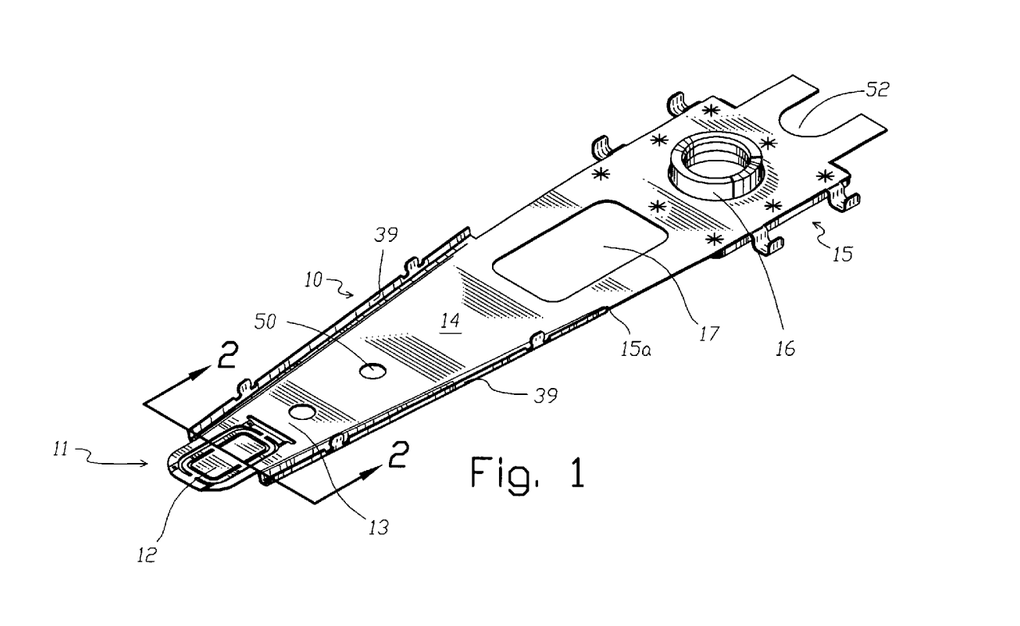
FIG. 1 is a top perspective view of a magnetic head suspension in accordance with this invention.

Channels or rails 39 at the edges of load beam region 14 have a depth h2 at the distal end of load beam region 14. The depth decreases along the length of load beam region 14, moving toward the proximal end, until there is no offset of the bottom of the channel from the surface of load beam region 14 at the point where rails 39 terminate in the vicinity of spring region cut-out 17, as shown in FIG. 1. Thus, edges 46 of rails 39 along the sides of load beam region 14 are level with the surface of load beam region 14 at a point approaching distal end 13 of load beam region 14 and the bottom of the channels or rails 39 are level with the planar surface of load beam region 14 at proximal end 15*a* of channels or rails 39. This tapering rail 39 arrangement provides increased loading clearance for a suspension by minimizing the height at proximal end 15 of structure 10 to allow increased disk to suspension clearance to facilitate lifting of the head slider and maximizing height h2 at distal end 13 of load beam region 14 to displace the head from the surface of the disk.

FIG. 5 is a sectional view of flexure region 11 of FIG. 4, taken along the line 5—5. FIG. 6 is a sectional view of flexure region 11 of FIG. 4, taken along the line 6—6. Note that, because of proximal offsets 36, 36' and distal offsets 38, 38', the plane of head support region 12 and first set of arms 26, 28 is recessed from and parallel to the plane of load beam region 14 and second set of arms 29, 31.

Although one arrangement of slot pattern or offset forms for constructing the flexible arms and head support region is shown in FIGS. 1–6, other arrangements are, in fact, possible to orient the slider in relation to the associated disk.

Figure 7:
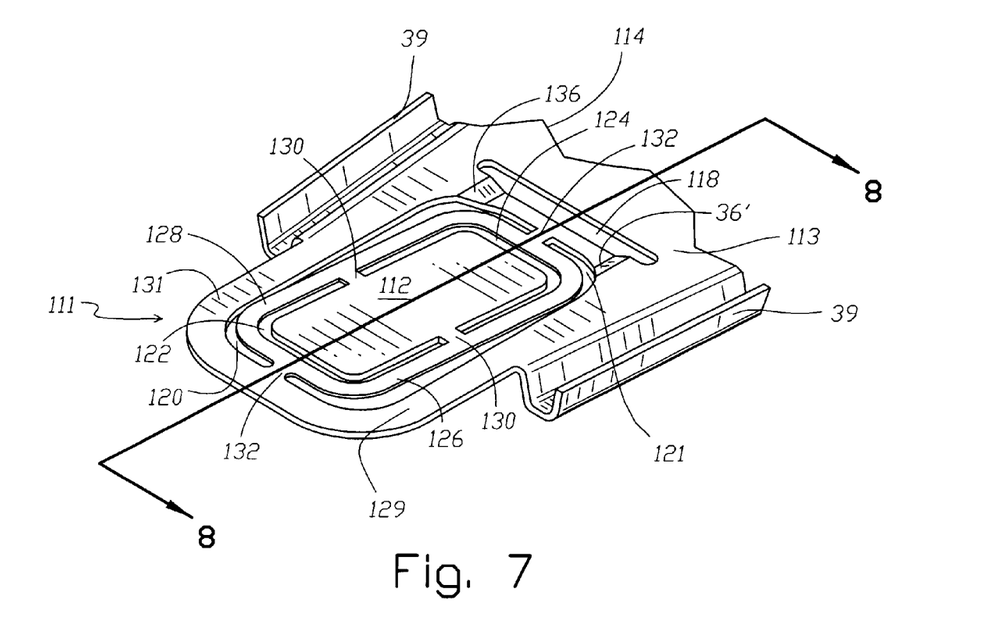
FIG. 7 is a top perspective detail view of a flexure region, showing the plane of the head support region recessed from and offset at an angle θ1 to the load beam region, along the longitudinal axis of the suspension.

Other arrangements of slot patterns or offset forms are also shown in FIGS. 7–13. In FIG. 7, head support region 112 is constructed integrally with the single one-piece structure containing load beam region 114 and flexure region 111. Flexure region 111 is constructed by etching a number of slots 118, 120, 121, 122, 124 in the vicinity of distal end 113 of load beam region 114 in order to define head support region 112, a pair of flexible arms 126, 128, which provide low stiffness in the pitch and roll axes, and a pair of relatively inflexible arms 129, 131 (relative to the flexible arms 126, 128), which form an outer supporting frame. First set of connecting torsion bars 130 join head support region 112 to first set of arms 126, 128 along the pitch axis, and second set of connecting torsion bars 132 join first set of arms 126, 128 to second set of arms 129, 131 along the roll axis. Thus, head support region 112 is able to move freely about those two axes, while providing high translational stiffness to keep the head mounted on head support region 112 from moving side to side or front to back as the actuator moves the slider across the face of the disk. Torsion bars 130, 132 combined with flexible arms 126, 128 make up the spring elements which allow gimballing suspension of head support region 112.

Figure 8:
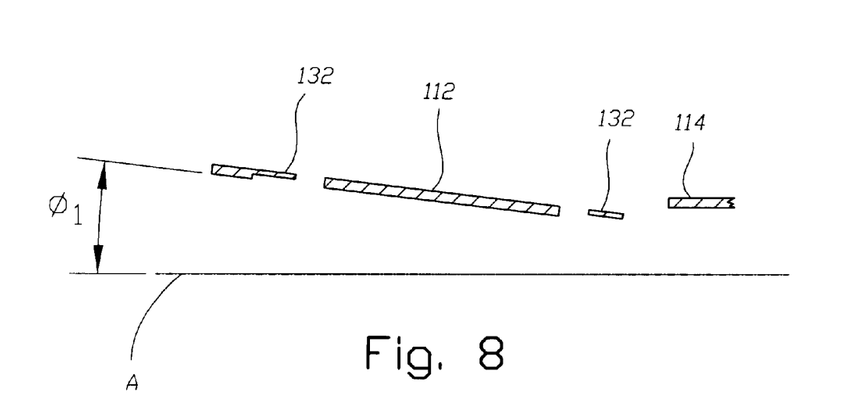
FIG. 8 is a sectional view of the flexure region of FIG. 7, taken along the line 8—8.

FIG. 8 is a sectional view of the flexure region 111 of FIG. 7, taken along the line 8—8. Note that, because of proximal offsets 136, 136', the plane of head support region 112 and first set of arms 126, 128 is recessed from the plane of load beam region 114 and second set of arms 129, 131, with the distal end of flexure region 111 angled upwards or away from horizontal baseline reference A along the longitudinal axis by angle θ1. Horizontal base line reference A is co-planar with the mounting surface of the baseplate (not shown).

Figure 9:
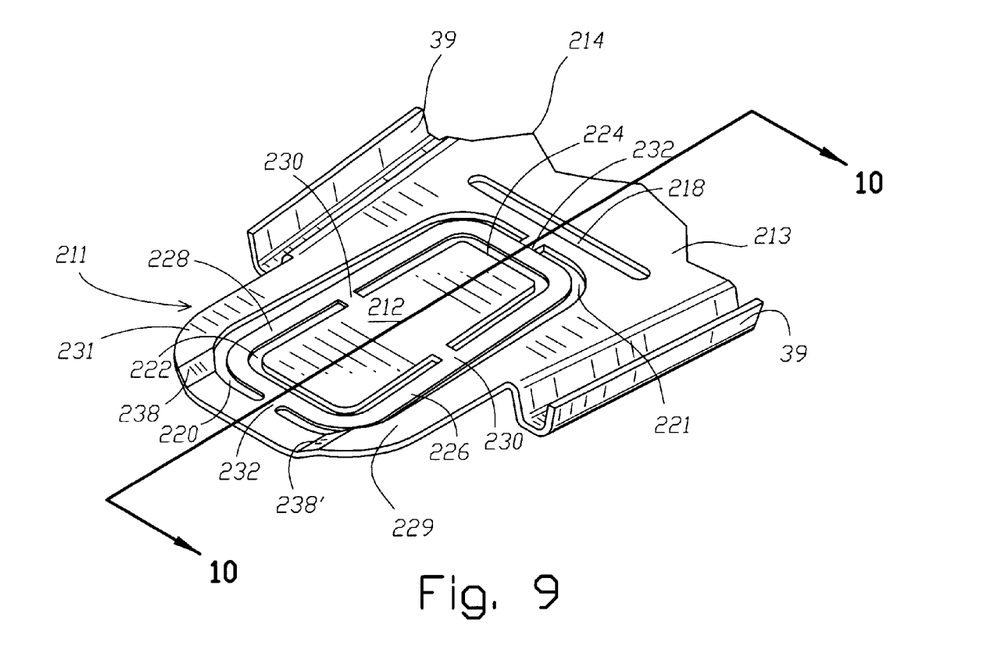
FIG. 9 is a top perspective detail view of a flexure region, showing the plane of the head support region recessed from and offset at an angle θ2 to the load beam region, along the longitudinal axis of the suspension.

In FIG. 9, head support region 212 is constructed integrally with the single one-piece structure containing load beam region 214 and flexure region 211. Flexure region 211 is constructed by etching a number of slots 218, 220, 221, 222, 224 in the vicinity of distal end 213 of load beam region 214 in order to define head support region 212, a pair of flexible arms 226, 228, which provide low stiffness in the pitch and roll axes, and a pair of relatively inflexible arms 229, 231 (relative to the flexible arms 226, 228), which provide an outer supporting frame. First set of connecting torsion bars 230 join head support region 212 to first set of arms 226, 228 along the pitch axis, and second set of connecting torsion bars 232 join first set of arms 226, 228 to second set of arms 229, 231 along the roll axis. Thus, head support region 212 is able to move freely about those two axes, while providing high translational stiffness to keep the head mounted on head support region 212 from moving side to side or front to back as the actuator moves the slider across the face of the disk. Torsion bars 230, 232 combined with flexible arms 226, 228 make up the spring elements which allow gimballing suspension of head support region 212.

Figure 10:
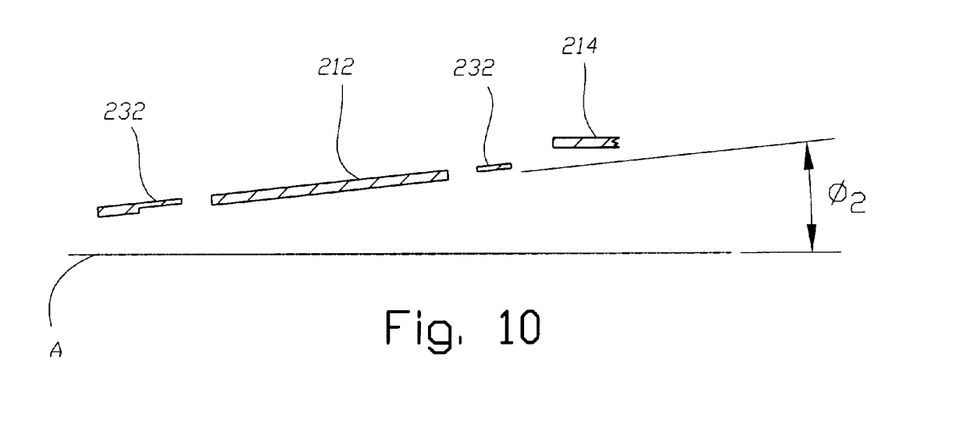
FIG. 10 is a sectional view of the flexure region of FIG. 9, taken along the line 10—10.

FIG. 10 is a sectional view of flexure region 211 of FIG. 9, taken along the line 10—10. Note that, because of distal offsets 238, 238', the plane of head support region 212 and first set of arms 226, 228 is recessed from the plane of load beam region 214 and second set of arms 229, 231, with the distal end of flexure region 211 angled downwards or toward horizontal baseline reference A along the longitudinal axis by angle θ2. Horizontal base line reference A is co-planar with the mounting surface of the baseplate.

Figure 11:
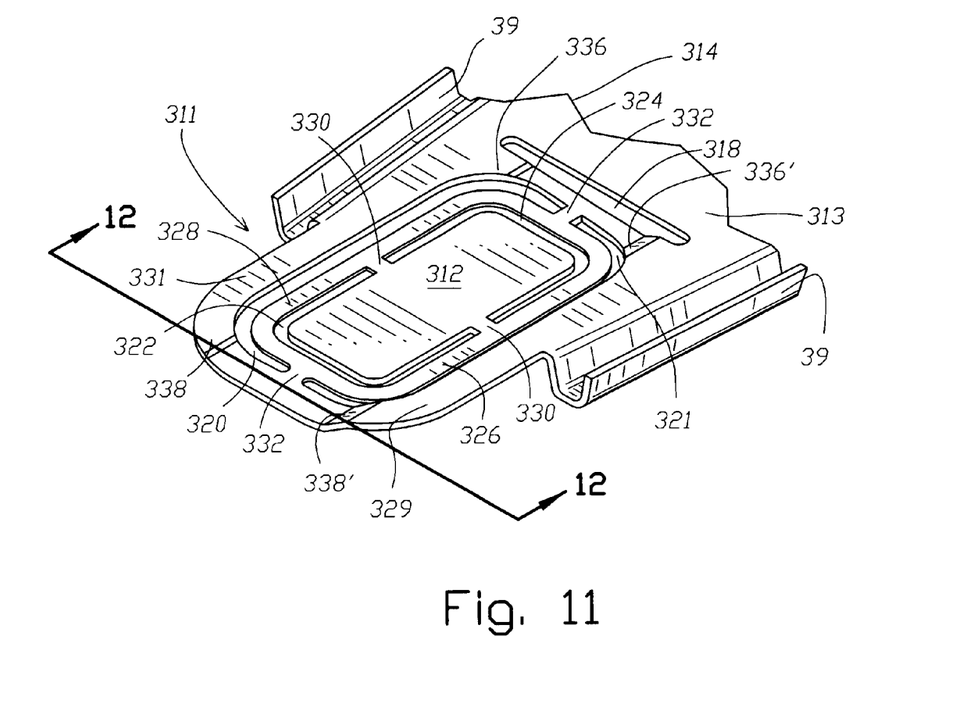
FIG. 11 is a top perspective detail view of a flexure region, showing the plane of the head support region recessed from and offset at an angle θ3 to the load beam region, along a transverse axis of the suspension.

In FIG. 11, head support region 312 is constructed integrally with single one-piece structure containing load beam region 314 and flexure region 311. Flexure region 311 is constructed by etching a number of apertures or slots 318, 320, 321, 322, 324 in the vicinity of distal end 313 of load beam region 314 in order to define head support region 312, a pair of flexible arms 326, 328 which provide low stiffness in the pitch and roll axes, and a pair of relatively inflexible arms 329, 331 (relative to the flexible arms 326, 328), which provide an outer supporting frame. First set of connecting torsion bars 330 join head support region 312 to first set of arms 326, 328 along the pitch axis, and second set of connecting torsion bars 332 join first set of arms 326, 328 to second set of arms 329, 331 along the roll axis. Thus, head support region 312 is able to move freely about those axes, while providing high translational stiffness to keep the head mounted on head support region 312 from moving side to side or front to back as the actuator moves the slider across the face of the disk. Torsion bars 330, 332 combined with flexible arms 326, 328 make up the spring elements which allow gimballing suspension of head support region 312.

Figure 12:
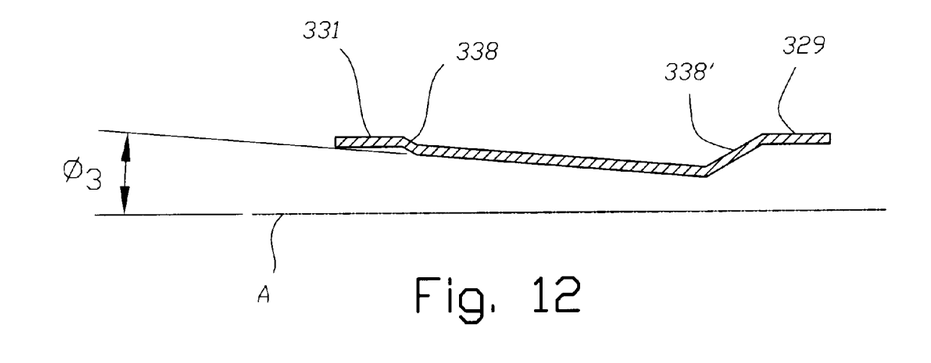
FIG. 12 is a sectional view of the flexure region of FIG. 11, taken along the line 12—12.

FIG. 12 is a sectional view of flexure region 311 of FIG. 11, taken along the line 12—12. Note that offsets 336', 338', closer to the left side of flexure region 311 (as viewed looking toward the distal end of flexure region 311), are deeper than offsets 336, 338, closer to the right side of flexure region 311 (as viewed looking toward the distal end of flexure region 311). Therefore, the plane of head support region 312 and first set of arms 326, 328 is recessed from the plane of load beam region 314 and second set of arms 329, 331, with the right side of flexure region 311 angled downwards or toward horizontal baseline reference A by angle θ3 along the transverse axis. Horizontal base line reference A is co-planar with the mounting surface of the baseplate.

Figure 13:
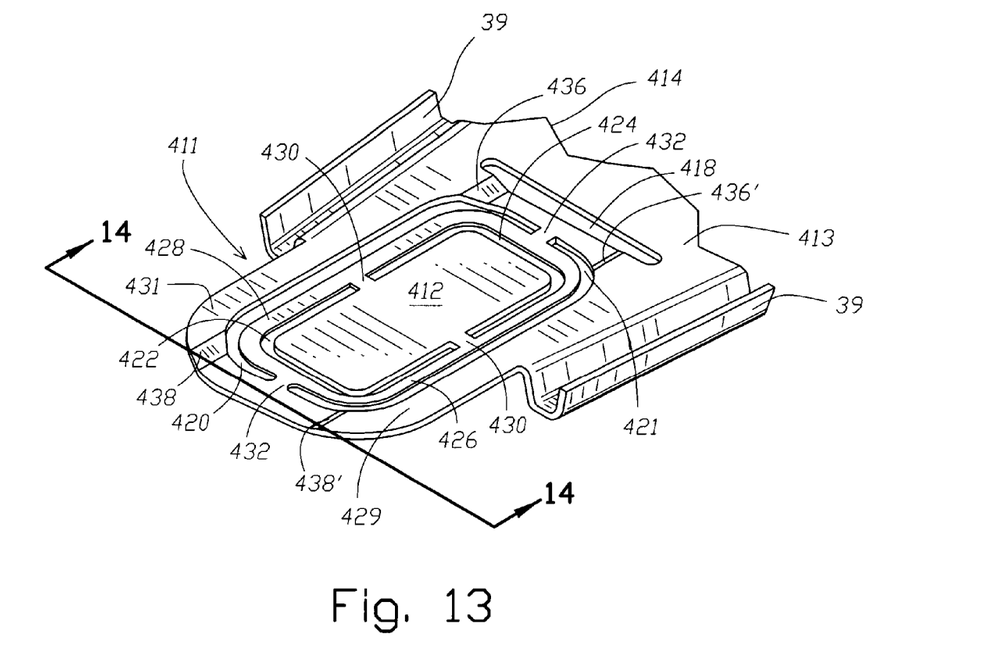
FIG. 13 is a top perspective detail view of a flexure region, showing the plane of the head support region recessed from and offset at an angle θ4 to the load beam region, along a transverse axis of the suspension.

In FIG. 13, head support region 412 is constructed integrally with the single one-piece structure containing load beam region 414 and flexure region 411. Flexure region 411 is constructed by etching a number of apertures or slots 418, 420, 421, 422, 424 in the vicinity of distal end 413 of load beam region 414 in order to define head support region 412 and a pair of flexible arms 426, 428, which provide low which provide low stiffness in the pitch and roll axes, and to form a pair of relatively inflexible arms 429, 431 (relative to the flexible arms 426, 428), which serve as an outer frame. First set of connecting torsion bars 430 join head support region 412 to first set of arms 426, 428 along the pitch axis, and second set of connecting torsion bars 432 join first set of arms 426, 428 to second set of arms 429, 431 along the roll axis. Thus, head support region 412 is able to move freely about those axes, while providing high translational stiffness to keep the head mounted on head support region 412 from moving side to side or front to back as the actuator moves the slider across the face of the disk.

Figure 14:
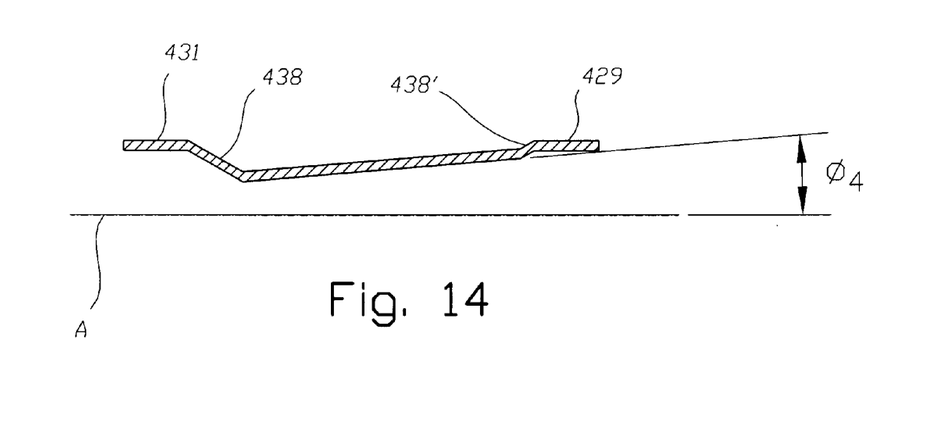
FIG. 14 is a sectional view of the flexure region of FIG. 13, taken along the line 14—14.

FIG. 14 is a sectional view of flexure region 411 of FIG. 13, taken along the line 14—14. Note that offsets 436, 438, closer to the right side of flexure region 411 (as viewed looking toward the distal end of the flexure region 411), are deeper than offsets 436', 438', closer to the left side of flexure region 411 (as viewed looking toward the distal end of the flexure region 411). Therefore, the plane of head support region 412 and first set of arms 426, 428 is recessed from the plane of load beam region 414 and second set of arms 429, 431, with the right side of flexure region 411 angled downwards or toward horizontal baseline reference A by angle θ4 along the transverse axis. Horizontal base line reference A is co-planar with the mounting surface of the baseplate.

Measurements and specific different dimensions of the various structures described herein can readily be determined by those of skill in this art to meet the needs of a particular application.

Flexure stiffness is known to increase as the cube of the flexure thickness. Integrated flexure—load beam structure 10, constructed according to the teachings of the present invention, as described above with reference to FIG. 1, with a flexure thickness of 0.0305±0.0025 mm (as measured at the thinnest portion of the flexure, that is, in the area of the first set of connecting torsion bars 30) has a flexure stiffness of 5.5 $\mu$N-m/deg in the pitch direction, 2.5 $\mu$N-m/deg in the roll direction, and a lateral stiffness of 109 kN/m. The same flexure without partial etching would have a stiffness in the pitch direction of 112 $\mu$N-m/deg, and a stiffness in the roll direction of 51 $\mu$N-m/deg, respectively. A common Watrous style flexure has a lateral stiffness of 9.3 kN/m. The static attitude capability is ±28' with adjustment of the nominal angles via the formed offset region. If the offsets were not present in the flexure of the load beam according to FIG. 1, the natural variation would be much larger.

The formed flexure offsets provide distinct advantages in enhancing the stiffness characteristics of the combined flexure—load beam structures according to FIGS. 1, 7, 9, 11, and 13, as compared to similar flexure—load beam structures without these offsets. The pitch stiffness with the slider in contact with the plane of the load beam (as would be the case of there were no offsets along the flexure arms) is extremely high. With the slider in contact with the load beam, the roll stiffness is 70.2 $\mu$N-m/deg. Note that this compares to a roll stiffness of 2.5 $\mu$N-m/deg given above for a load beam with offsets, as described with reference to FIG. 1.

High lateral stiffness serves two purposes. One purpose is to provide a spring to counteract lateral accelerations at the head. The lateral accelerations may result from, but are not limited to, such events as the head or actuator coming to a crash stop during a seek or a drive subjected to external accelerations, such as those found in portable applications. Assuming that the lateral forces generated are below the design limits, a one-piece integrated flexure—load beam structure, as described for the present invention, will return the head to its original position. Traditional dimple/load beam interfaces, that is a Watrous style flexure constructed separately from and attached to a load beam, is not able to return the head to its original position. The difference is that with an integrated flexure, the head is positioned relative to the load beam with a set of torsioned "springs". Dimple/load beam interfaces use linear springs in combination with non-linear frictional effects to provide the head positioning. The result is that, when the head is subjected to high lateral accelerations, the relatively low lateral stiffness of the flexure will not return the head completely. The head will be offset from the desired location by the distance where the lateral stiffness equals the dynamic friction at the dimple/load beam interface.

If the head support region 12 were not offset below the plane of the load beam region 14 (as shown for the integrated flexure/load beam of FIGS. 2, 3 and 5), the frame surrounding the flexure would have to be expanded by >0.72 mm. The result would be reduced storage capacity. For example, a 1.8" drive with a 8.9 mm radius hub would lose 1.65 mm$^2$. At average storage capacities of 279 kbits/mm$^2$ (80 tracks/mm, 3487 bits/mm), the drive manufacturer loses a total of 460 kbits. The same situation holds true for the head support region 112 which is offset below the plane of the load beam region 114 in FIGS. 7 and 8, for the head support region 212 which is offset below the plane of the load beam region 214 in FIGS. 9 and 10, for the head support region 312 which is offset below the plane of the load beam region 314 in FIGS. 11 and 12, and for the head support region 412 which is offset below the plane of the load beam region 414 in FIGS. 13 and 14.

The provision of two sets of offsets 36, 36', 38, 38' for the integral one-piece flexure—load beam structure 10 according to FIGS. 1, 4 and 6 allows the nominal pitch and roll angles to be varied, thus varying the z-heights. Through selective offset forming in the integral flexure—load beam structures according to FIGS. 7–14, the height of either end and/or of either side of the head support region 112, 212, 312, 412 of the flexure regions 111, 211, 311, 411, respectively, with regard to the horizontal baseline reference A can be varied independently. This allows the relative angle θ of the flexure region and the head support region to be selected during construction.

It is also possible to vary the roll angle of the one-piece flexure—load beam structure by changing the height of the ends of the head support region and the flexure region. This capability permits various z-heights with a single assembly design and still allows maintaining the nominal head/flexure angle at 0 degrees relative to the disk. Positive pitch angles have been shown to reduce take-off time in start up coming off a ramp. A roll bias may improve the flying characteristics of a head given various skew angles and changing linear velocities.

Conventional means for positioning and aligning the slider with respect to the head support region include the insertion of tooling pins through a first hole in the planar surface of the load beam and through a second hole in the base portion of the load beam in the vicinity of the swaging boss. Since the location of the slider using that arrangement was dependant on tolerances between the flexure and load beam, load beam and base plate, manufacture of the base plate, manufacture of the load beam, and manufacture of the flexure, the location of the slider was not as accurate as required for some applications. One other prior art locating concept consists of inserting tooling pins through a hole and slot which are located in the load beam planar surface area. Because the distance between the hole and slots as used in prior art devices was small, the location accuracy was not sufficient for all purposes.

The improved fixturing or locating system described in commonly assigned U.S. Pat. No. 5,198,945, consists of positioning a first tooling pin through a hole 50 in the load beam very near the flexure and a second tooling pin through a slot 52 in the load beam at the very end opposite the flexure region 11 (as seen in FIG. 1). With the hole 50 and slot 52 being substantially displaced from each other, and the flexure region 11 integrated into the load beam region 14, locating tolerances are much improved.

What is claimed is:

1. A head suspension including a one-piece load beam and flexure structure fabricated from one piece of spring steel, the load beam and flexure structure comprising a rigid region having longitudinal and transverse axes, a mounting region on a proximal end of the rigid region and a flexure region having a planar support region and an integral flexure on a distal end of the rigid region, said planar support region existing in a first plane, the integral flexure including a slider-receiving region and first and second opposed connecting torsion bars for connecting the slider-receiving region to the support region and for allowing gimbaled suspension of the slider-receiving region, wherein the improvement comprises a first formed offset for connecting the first connecting torsion bar to the support region on the distal end of the rigid region and a second formed offset for connecting the second connecting torsion bar to the support region on the distal end of the rigid region, the first and second formed offsets positioning the slider-receiving region in a second plane which is offset from the first plane of the planar support region on the distal end of the rigid region.

2. The head suspension of claim 1 wherein the first and second formed offsets connect the first and second connecting torsion bars to the support region on the distal end of the rigid region and position the slider-receiving region such that the second plane is offset from and parallel to the first plane of the planar support region on the distal end of the rigid region.

3. The head suspension of claim 1 wherein the first and second formed offsets connect the first and second connecting torsion bars to the support region on the distal end of the rigid region and position the second plane of the slider-receiving region such that the second plane is offset from the first plane of the planar support region on the distal end of the rigid region and at an angle with respect to the longitudinal axis of the head suspension.

4. The head suspension of claim 1 wherein the first and second formed offsets connect the first and second connecting torsion bars to the support region on the distal end of the rigid region and position the second plane of the slider-receiving region such that the second plane is offset from the first plane of the planar support region on the distal end of the rigid region and at an angle with respect to the transverse axis of the head suspension.

5. The head suspension of claim 1 wherein the first and second formed offsets connect the first and second connecting torsion bars to the support region on the distal end of the rigid region and position the second plane of the slider-receiving region such that the second plane is offset from the first plane of the planar support region on the distal end of the rigid region and at an angle with respect to the longitudinal and transverse axes of the head suspension.

6. A head suspension including a one-piece load beam and flexure structure fabricated from one piece of spring steel, the load beam and flexure structure comprising a rigid region having longitudinal and transverse axes, a mounting region on a proximal end of the rigid region and a flexure region having a planar support region and an integral flexure on a distal end of the rigid region, said planar support region existing in a first plane, the integral flexure including a slider-receiving region and first and second opposed connecting torsion bars for connecting the slider-receiving region to the support region and for allowing gimbaled suspension of the slider-receiving region, wherein the improvement comprises at least a first formed offset for connecting the first connecting torsion bar to the support region on the distal end of the rigid region and positioning the slider-receiving region in a second plane which is angled with respect to the first plane of the planar support region on the distal end of the rigid region.

\* \* \* \* \*